United States Patent
Nakamura et al.

Patent Number: 5,327,892
Date of Patent: Jul. 12, 1994

[54] ULTRASONIC IMAGING SYSTEM

[75] Inventors: Yasuhiro Nakamura; Hisashi Akiyama, both of Yokohama; Satoshi Akaishi, Fujisawa, all of Japan

[73] Assignee: Matsushita Electric Industrial Co., Ltd., Osaka, Japan

[21] Appl. No.: 68,172

[22] Filed: May 28, 1993

[30] Foreign Application Priority Data

Jun. 30, 1992 [JP] Japan ................................. 4-172308

[51] Int. Cl.$^5$ ............................................. A61B 8/00
[52] U.S. Cl. ................................................. 128/660.07
[58] Field of Search ............... 128/660.01, 660.07, 128/661.09; 358/112; 330/85; 73/861.25, 602

[56] References Cited

U.S. PATENT DOCUMENTS

| | | | |
|---|---|---|---|
| 4,561,019 | 12/1985 | Lizzi et al. | 358/112 |
| 4,660,565 | 4/1987 | Shirasaka | 128/661.09 |
| 5,072,735 | 12/1991 | Okazaki et al. | 128/660.07 |

FOREIGN PATENT DOCUMENTS

368088  7/1991  Japan ............... 128/660.01

Primary Examiner—William E. Kamm
Assistant Examiner—George Manuel
Attorney, Agent, or Firm—Stevens, Davis, Miller & Mosher

[57] ABSTRACT

An ultrasonic imaging system includes an ultrasonic probe for transmitting and receiving an ultrasonic wave, a driver unit for driving the ultrasonic probe, a detector unit for detecting an echo signal received by the ultrasonic probe, a filter unit operative to pass a detection signal from the detector unit and having a plurality of passbands which have respective flat frequency response characteristics and respective gains different from each other, a scanning conversion unit for converting the detection signal, which has passed through the filter unit, to a display signal to be displayed on a television, etc., and a display unit receiving the display signal from the scanning conversion unit to display it as a tomographic image. The filter unit operates to decrease respective amplitudes of high frequency components contained in the detection signal and to reduce a difference in brightness between adjacent scanning lines of the display unit, and flat frequency response characteristics of the filter unit prevent deterioration of frequency response characteristics of the detection signal. This makes it possible to produce a tomographic image of high resolution up to the resolution limit of the scanning lines of the display unit without impairing the image quality.

4 Claims, 4 Drawing Sheets

FILTER MEANS

ULTRASONIC IMAGING SYSTEM

BACKGROUND OF THE INVENTION

The present invention relates to an ultrasonic imaging system for visualizing the structure and movement in a living body.

FIG. 1 shows a construction of a conventional ultrasonic imaging system. In FIG. 1, an ultrasonic probe 51 converts a pulse signal into an ultrasonic signal, transmits the converted ultrasonic signal to an object under measurement, receives an echo signal from the object under measurement, and converts the echo signal into an electrical signal. Driver means 52 generates the pulse signal and supplies it to the ultrasonic probe 51. An amplifier 53 amplifies the echo signal returning from the object under measurement and received by the ultrasonic probe 51. Logarithmic conversion (compression) means 54 performs logarithmic conversion of the amplitude of the echo signal amplified by the amplifier 53. Detector means 55 performs AM detection of the logarithmically compressed echo signal and detects an envelope of the echo signal. Scanning conversion means 56 composed of an A/D converter 56a, a memory 56b and a D/A converter 56c, takes in a detection signal of the echo signal, which has been AM detected by the detector means 55, and converts the detection signal to an image signal according to a TV system represented by the NTSC system to form a two-dimensional tomographic image. Display means 57 such as a television displays a tomographic image indicating inner portions of the object under measurement. Generally, a low-pass filter for preventing generation of an aliasing noise on the basis of the sampling theorem is provided at an input portion of the A/D converter 56a. However, this low-pass filter is different from filter means of the present invention, and it is not illustrated here in order to simplify the explanation of the present invention.

With respect to the above-described construction, the operation thereof will be described hereunder.

The ultrasonic probe 51 is driven by a pulse signal generated by the driver means 52 to perform transmitting and receiving operations by transmitting an ultrasonic pulse, while performing a scanning operation with the transmitted ultrasonic pulse, and by receiving an echo signal returning from a tomographic plane in an object under measurement. The echo signal thus obtained is amplified by the amplifier 53 and its amplitude is subjected to logarithmic conversion by the logarithmic conversion (compression) means 54. The logarithmically converted echo signal is subjected to AM detection by the detector means 55 so that the detection signal represents an envelope of the echo signal, and the detection signal is outputted to the scanning conversion means 56. The detection signal is converted to a digital signal by the A/D converter 56a of the scanning conversion means 56, and the A/D conversion signal is written in the memory 56b. Since an address of the memory 56b, in which the A/D conversion signal data is written, is made to correspond to a position of the portion of the object under measurement from which the echo signal has been generated, tomographic image information of the object under measurement is stored in the memory 56b, being arranged two-dimensionally therein. The tomographic image information stored in the memory 56b is subjected to D/A conversion by the D/A converter 56c so as to comply with the television display system for the display means 57 and is outputted to the display means 57, whereby a tomographic image is displayed on the display means 57.

As described above, in the conventional ultrasonic imaging system, the ultrasonic probe 51 performs transmitting and receiving operations of an ultrasonic pulse, while performing a scanning operation, to thereby obtain a tomographic image of portions of an object under measurement.

In the conventional ultrasonic imaging system, however, an image displayed on a television display used as the display means 57 is represented by the scanning line. Accordingly, the resolution of an image which can be displayed is determined by the television scanning line. In addition, even if the resolution of an image is retained within a resolution limit, when displaying a tomographic image of a fine composition which is near the resolution limit, a difference in brightness between adjacent television scanning lines is increased due to a high spatial frequency of the tomographic image. As a result, it becomes impossible to represent intermediate brightness, which raises a problem that the quality of a diagnostic image is deteriorated significantly.

SUMMARY OF THE INVENTION

The present invention intends to solve the above-mentioned problem presented in the conventional ultrasonic imaging system, and it is an object of the present invention to provide an ultrasonic imaging system which can represent a tomographic image of high resolution up to a resolution limit of the television scanning line of a display means without deteriorating the quality of the tomographic image.

In order to attain the above-mentioned object, the ultrasonic imaging system according to the present invention comprises an ultrasonic probe for transmitting and receiving an ultrasonic wave, driver means for driving the ultrasonic probe, detector means for detecting an echo signal received by the ultrasonic probe, filter means operative to pass the detection signal therethrough and having a plurality of passbands which have respective flat frequency response characteristics and respective gains different from each other, scanning conversion means for converting the detection signal, which has passed through the filter means, to a display signal for display on a display system such as a television, and display means for displaying thereon the display signal converted by the scanning conversion means in the form of a tomographic image.

Further, it is preferable to set the gains of the plurality of passbands of the filter means to decrease toward higher frequency passbands.

Accordingly, in accordance with the present invention, an echo signal detected by the detector means is made to pass through the filter means so that respective amplitudes of higher frequency components contained in a detection signal are decreased and a difference in brightness between adjacent television scanning lines is reduced. In addition, since respective frequency response characteristics of a plurality of passbands of the filter means are flattened, deterioration of pulse response characteristics of the detection signal can be prevented.

DESCRIPTION OF THE PREFERRED EMBODIMENTS

An embodiment of the present invention will be described hereunder with reference to the accompanying drawings.

Figure 1:
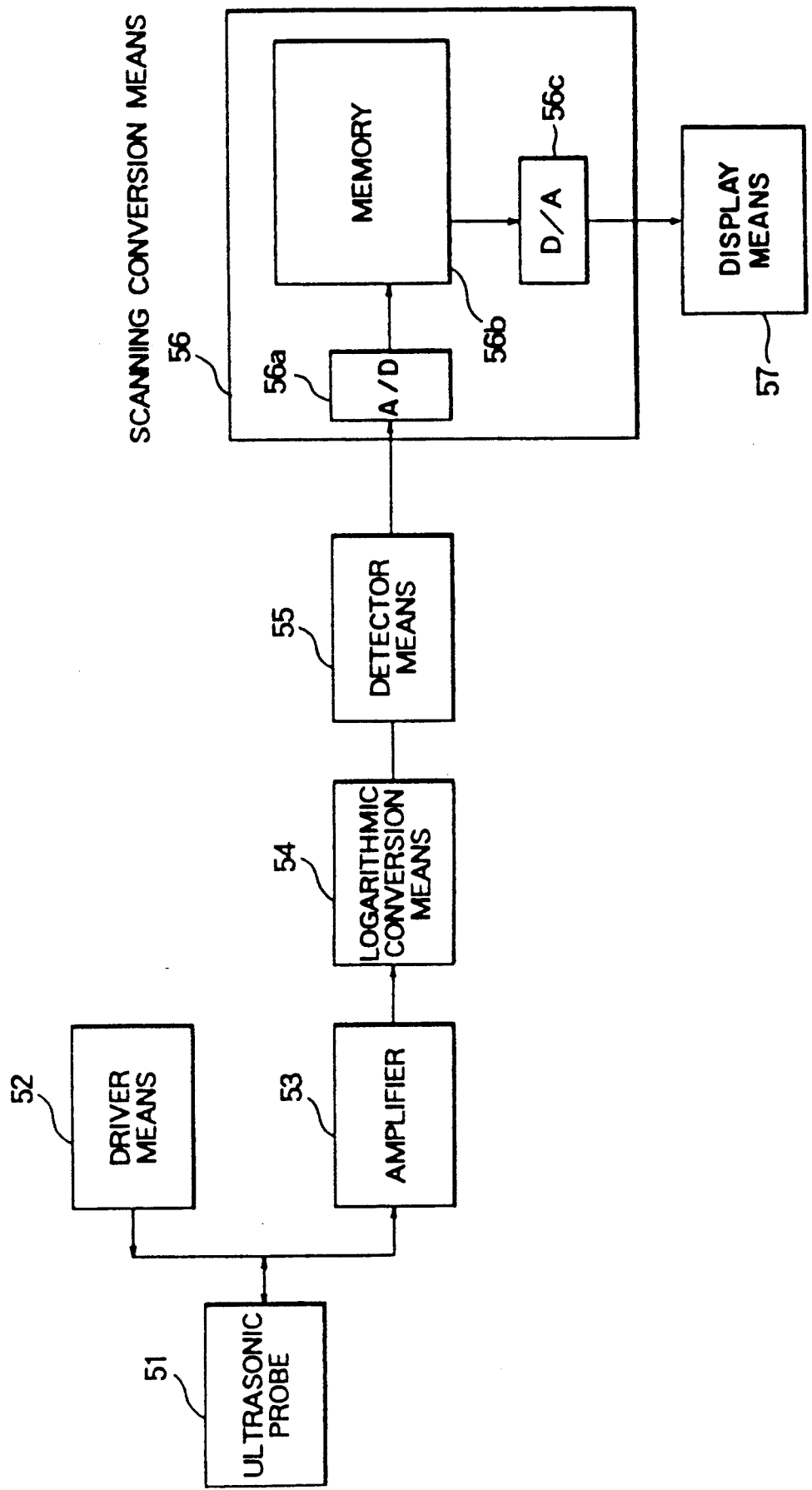
FIG. 1 is a schematic block diagram showing a conventional ultrasonic imaging system.
Figure 2:
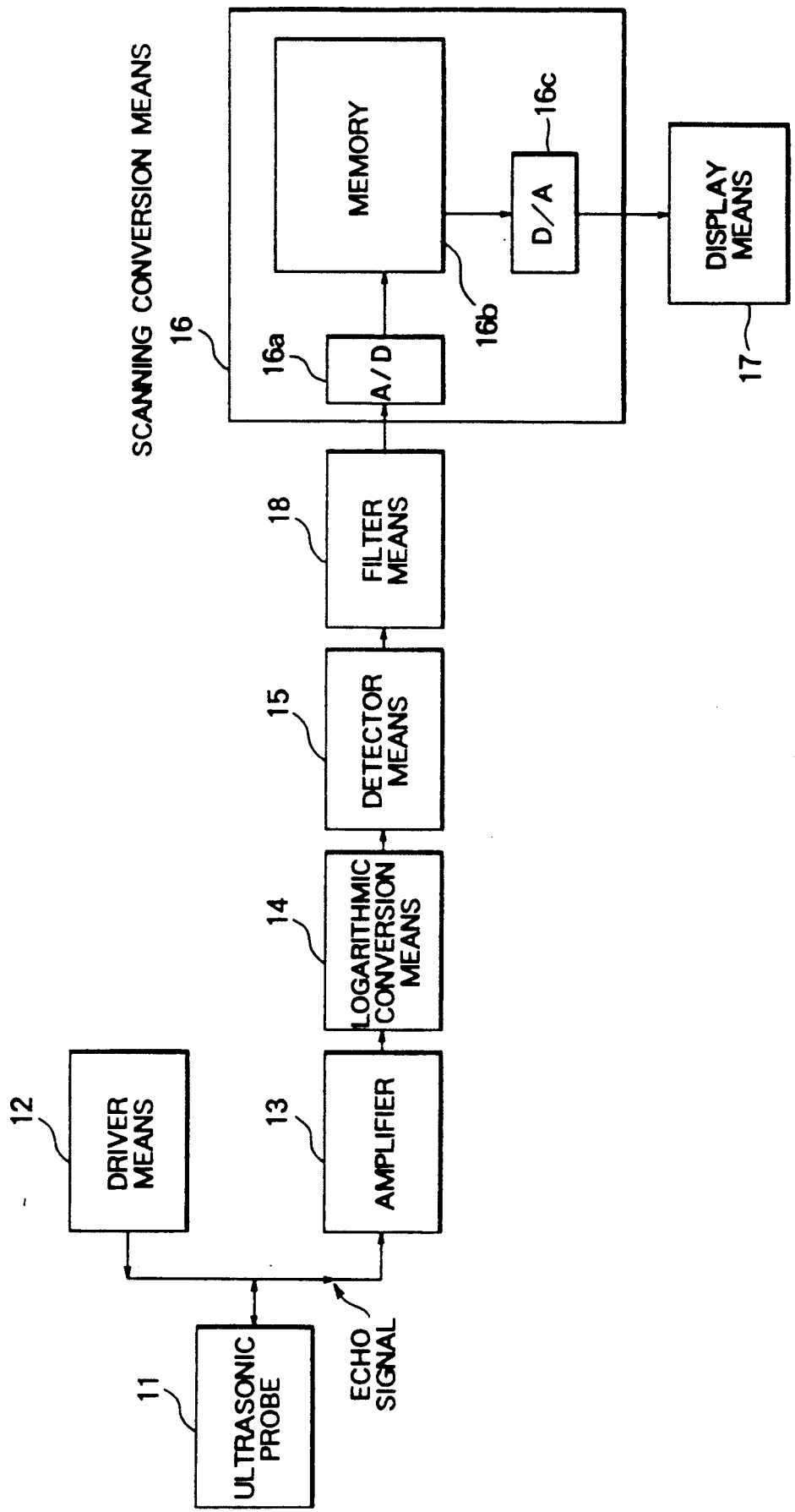
FIG. 2 is a schematic block diagram showing an ultrasonic imaging system according to an embodiment of the present invention.

FIG. 2 is a schematic block diagram showing an ultrasonic imaging system of an embodiment of the present invention.

Referring to FIG. 2, an ultrasonic probe 11 converts a pulse signal to an ultrasonic signal, transmits the ultrasonic signal into an object under measurement, receives an echo signal returning from the object under measurement, and converts it to an electrical signal. Driver means 12 generates a pulse signal and sends it to the ultrasonic probe 11. An amplifier 13 amplifies the echo signal which has returned from the object and which has been received by the ultrasonic probe 11. Logarithmic conversion (compression) means 14 performs logarithmic conversion of an amplitude of the echo signal amplified by the amplifier 13. Detector means 15 performs AM detection of the logarithmically converted echo signal to thereby detect an envelope of the echo signal. Filter means 18 has a plurality of passbands which have respective flat frequency response characteristics and respective gains different from each other. The filter means 18 passes therethrough a detection signal supplied from the detector means 15. Scanning conversion means 16 is composed of an A/D converter 16a, a memory 16b and a D/A converter 16c, takes in the detection signal outputted from the filter means 18, and converts the detection signal to an image signal in compliance with a TV system represented by the NTSC system, wherein the image signal represents a two-dimensional tomographic image. Display means 17 such as a television responds to the image signal and displays a tomographic image showing inner portions of the object under measurement.

In addition, in the same way as a conventional system, a low-pass filter for preventing generation of an aliasing noise on the basis of the sampling theorem is provided at an input portion of the A/D converter 16a.

With the above-described construction of the system of the present invention, the operation thereof will be described hereinafter.

Figure 3:
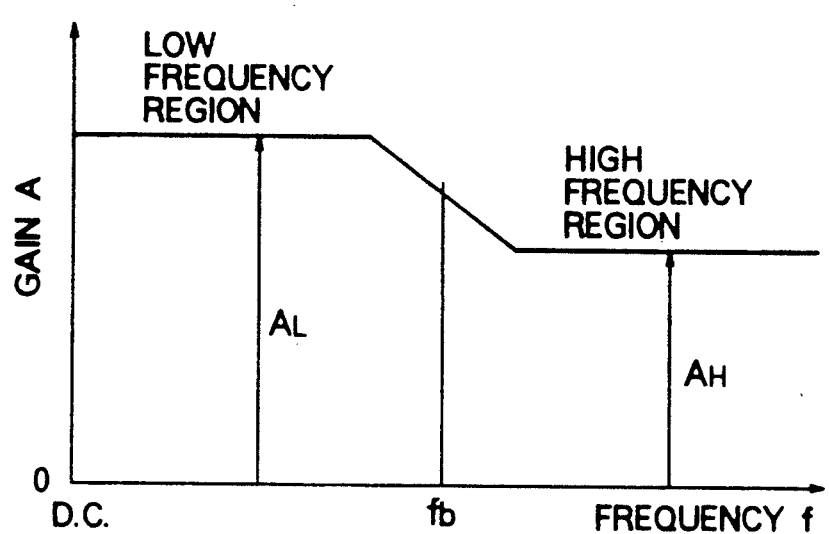
FIG. 3 is a characteristic diagram showing frequency response characteristics of the filter means 18 in the system shown in FIG. 2.

The ultrasonic probe 11 is driven by a pulse signal generated by the driver means 12 to perform transmitting and receiving operations by transmitting an ultrasonic pulse, while performing a scanning operation with the transmitted ultrasonic pulse, and by receiving an echo signal returning from a tomographic plane in an object under measurement. The thus obtained echo signal is amplified by the amplifier 13 and its amplitude is logarithmically converted by the logarithmic conversion (compression) means 14. The logarithmically converted echo signal is subjected to AM detection in the detector means 15, whereby a detection signal, which represents an envelope of the echo signal, is obtained, and then the detection signal is outputted to the filter means 18. The filter means 18 has frequency response characteristics which are flat in a low frequency region and a high frequency region, respectively, as shown in FIG. 3, and which have respective gains in the low frequency region and the high frequency region, the gains being relatively different from each other, so that the amplitudes of components of the detection signal passing through the filter means 18, which components are distributed in the high frequency region, are decreased. The detection signal from the filter means 18 is subjected to A/D conversion by the A/D converter 16a of the scanning conversion means 16 and is written in the memory 16b. Tomographic image information stored in the memory 16b is subjected to D/A conversion by the D/A converter 16c, that is, it is converted in compliance with the television system of the display means 17, and the D/A conversion signal is outputted to the display means 17 so that a tomographic image is displayed on the display means 17.

Figure 4:
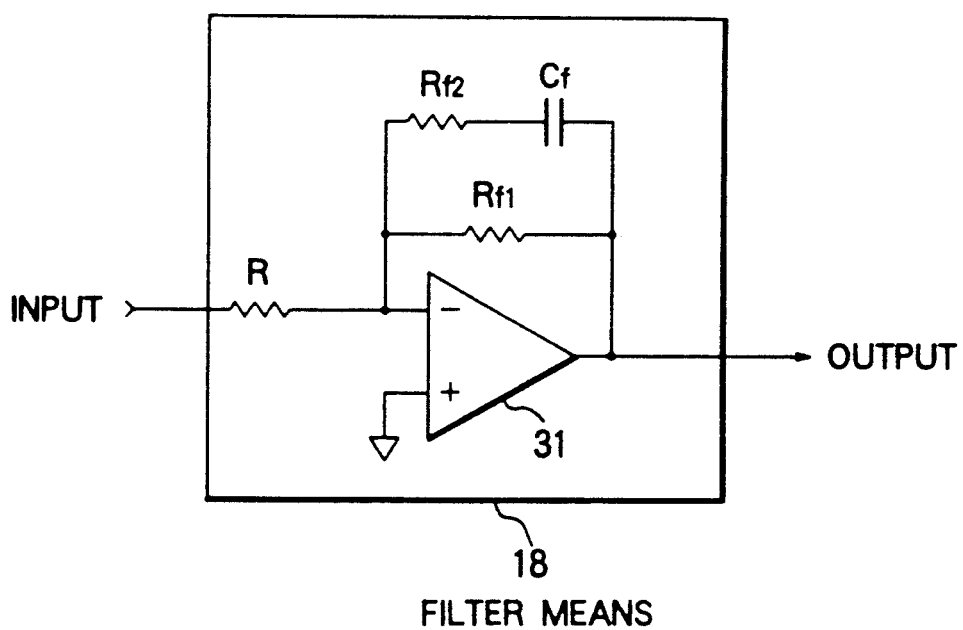
FIG. 4 is a circuit diagram showing an example of the construction of the filter means 18 in the system shown in FIG. 2.

Next, the filter means 18 will be described in greater detail. FIG. 4 is a circuit diagram showing an example of the filter means 18 for realizing the frequency response characteristics shown in FIG. 3. Referring to FIG. 4, an inverting amplifier 31 is connected with a negative feedback circuit formed of resistors $R_{f1}$ and $R_{f2}$ and a capacitor Cf, and this circuit of the filter means 18 has frequency response characteristics represented by the following equations (1) to (3), in connection with the value of a resistor R connected to the input end of the inverting amplifier 31:

$$A_L = R_{f1}/R \tag{1}$$

$$A_H = (R_{f1} \cdot R_{f2})/\{R \cdot (R_{f1} + R_{f2})\} \tag{2}$$

$$fb = 1/\{2\pi Cf \cdot (R_{f1} + R_{f2})\} \tag{3}$$

In connection with the frequency response characteristics shown in FIG. 3, the above-mentioned equations (1) to (3) give the gain $A_L$ of the flat portion of the low frequency region, the gain $A_H$ of the flat portion of the high frequency region, and a frequency fb at the boundary between the low frequency region and the high frequency region.

Figure 5A:
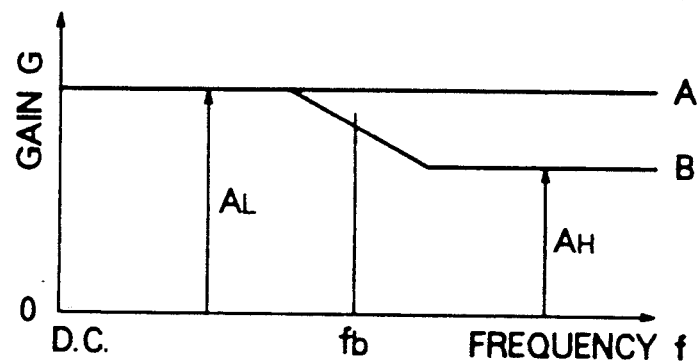
FIG. 5A is an explanatory drawing illustrating a change of the gain in the frequency response characteristics of the filter means 18 in the system shown in FIG. 2.
Figure 5B:
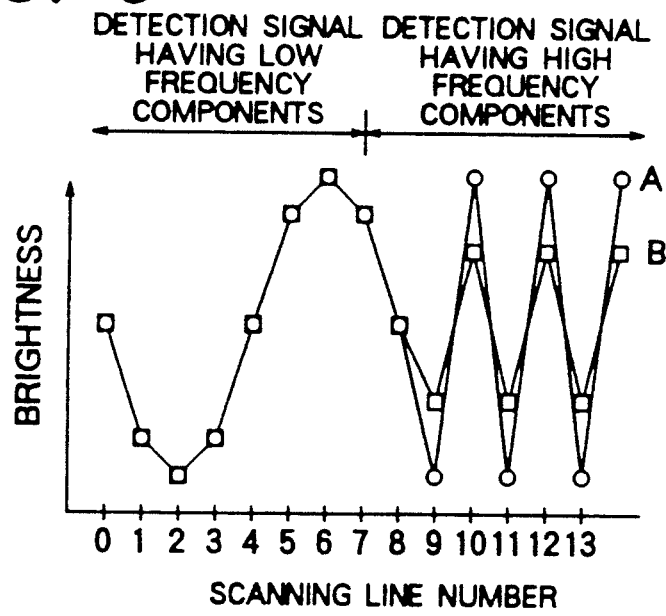
FIG. 5B is an explanatory drawing for explaining a change of the brightness waveform of a tomographic image caused by the use of the filter means 18 in the system shown in FIG. 2.

FIG. 5A is an explanatory drawing which illustrates the distribution of the gain in the frequency response characteristics of the filter means 18 shown in FIG. 4. FIG. 5B is an explanatory drawing for explaining how a brightness waveform of a tomographic image displayed on the display means 17 changes as the gain in the frequency response characteristics of the filter means 18 changes in accordance with the values of the resistors $R_{f1}$ and $R_{f2}$ and capacitor Cf. In the graph of FIG. 5B, the horizontal axis thereof represents a line in a direction perpendicular to respective television scanning lines, and the abscissa represents positions of the respective television scanning lines which are arranged perpendicularly to the horizontal axis. The ordinate of the graph represents brightness of the respective scanning lines on the television screen. A characteristic curve A shown in FIG. 5A indicates a frequency response characteristic which is flat over the entire frequency range, that is, a frequency response characteristic obtained when the resistor $R_{f1}$ and the capacitor Cf are not employed, in other words, this characteristic curve A corresponds to the same construction as that of the conventional system devoid of the filter means 18. In this case, the brightness waveform of a tomographic image is shown by a waveform A in FIG. 5B. More particularly, when the detection signal contains low frequency components, spots indicative of brightness signal level thereof are distributed with shorter distance steps on the respective consecutive television scanning lines, as shown at waveform A in the left half of FIG. 5B, and therefore a difference in brightness level between adjacent television scanning lines is reduced and intermediate brightness tones can be represented. Also, when the detection signal contains high frequency components, a large difference in brightness occurs between adjacent television scanning lines as shown at waveform A in the right half of FIG. 5B, and therefore the detection signal is visualized as a binary image devoid of intermediate brightness, thereby impairing the image quality significantly. Then, according to the present invention, values of the resistor $R_{f1}$ and the capacitor Cf are selected suitably to decrease the gain $A_H$ in the high frequency region as shown at the characteristic curve B in FIG. 5A, whereby it becomes possible to reduce the difference in brightness between adjacent television scanning lines as shown at waveform B in the right half of FIG. 5B, even in the case of the detection signal containing high frequency components.

Thus, in accordance with the ultrasonic imaging system of the above-described embodiment of the present invention, an echo signal detected by the detector means 15 is passed through the filter means 18 so that the amplitude of high frequency components contained in the detected signal can be decreased, whereby the difference in brightness between adjacent television scanning lines can be reduced. Further, since the filter means 18 has flat frequency response characteristics in a plurality of passbands, deterioration of pulse response characteristics of the detection signal can be prevented.

The values of the gain $A_L$ in the low frequency region, the gain $A_H$ in the high frequency region, and the boundary frequency fb are selected in accordance with the television system of the display means 17. Therefore, it is necessary to determine the values of such factors taking into consideration the quality of an image displayed on the display means 17. In the standard television system such as the NTSC system, the boundary frequency fb is set to about 100 to 500 kHz, and the ratio $A_L:A_H$ between the gain $A_L$ in the low frequency region and the gain $A_H$ in the high frequency region is selected to be about 1:0.6 to 1:0.9.

As described above, according to the present invention, by passing an echo signal detected by the detector means through the filter means, it is possible to decrease the amplitude of high frequency components contained in a detection signal and the difference in brightness between adjacent television scanning lines.

In addition, since the filter means has flat frequency response characteristics in a plurality of frequency regions, it is possible to avoid degradation of pulse response characteristics of the detection signal. As a result, it is possible to produce a tomographic image of high resolution up to the resolution limit of the television scanning line of the display means without impairing the image quality.

We claim:
1. An ultrasonic imaging system comprising:
   (a) an ultrasonic probe for transmitting and receiving an ultrasonic wave;
   (b) driver means for driving said ultrasonic probe;
   (c) detector means for detecting an echo signal of a single passband received by said ultrasonic probe to generate a detection signal;
   (d) filter means for receiving and passing said detection signal therethrough and having a plurality of passbands which have respective flat frequency response characteristics, wherein respective gains of the plurality of passbands are set to decrease toward higher frequency passbands;
   (e) scanning conversion means for converting the detection signal, which has passed through said filter means, to a display signal; and
   (f) display means for displaying thereon the display signal converted by said scanning conversion means in the form of a tomographic image.

2. An ultrasonic imaging system according to claim 1, wherein said detector means detects an envelope of said echo signal to generate said detection signal.

3. An ultrasonic imaging system comprising:
   (a) an ultrasonic probe for transmitting and receiving an ultrasonic wave;
   (b) driver means for driving said ultrasonic probe;
   (c) detector means for detecting an echo signal received by said ultrasonic probe to generate a detection signal;
   (d) filter means receiving and passing said detection signal therethrough and having a plurality of passbands which have respective flat frequency response characteristics and respective gains different from each other;
   (e) scanning conversion means for converting the detection signal, which has passed through said filter means, to a display signal; and
   (f) display means for displaying thereon the display signal converted by said scanning conversion means in the form of a tomographic image, wherein:
   said filter means comprises an inverting amplifier having one input terminal supplied with said detection signal through an input resistor, said inverting amplifier being connected with a negative feedback circuit comprising a resistor connected between the one input terminal and an output terminal of said inverting amplifier and a series circuit of a capacitor and a resistor connected in parallel with said resistor.

4. An ultrasonic imaging system comprising:
   (a) an ultrasonic probe for transmitting and receiving an ultrasonic wave;
   (b) driver means for driving said ultrasonic probe;
   (c) detector means for detecting an echo signal of a single passband received by said ultrasonic probe to generate a detection signal;
   (d) filter means for receiving and passing said detection signal therethrough and having a plurality of passbands which have respective flat frequency response characteristics, wherein respective gains of the plurality of passbands are set to decrease toward higher frequency passbands;

(e) scanning conversion means for converting the detection signal, which has passed through said filter means, to a display signal; and (f) display means for displaying thereon the display signal converted by said scanning conversion means in the form of a tomographic image, wherein:

said filter means comprises an inverting amplifier having one input terminal supplied with said detection signal through an input resistor, said inverting amplifier being connected with a negative feedback circuit comprising a resistor connected between the one input terminal and an output terminal of said inverting amplifier and a series circuit of a capacitor and a resistor connected in parallel with said resistor.

* * * * *